3,433,848
METHOD OF CONTROLLING SELECTIVITY IN AN AROMATIC HYDROCARBON DEALKYLATION PROCESS
James T. Devins and Robert E. Quisenberry, Port Arthur, Tex., assignors to Texaco Inc., New York, N.Y., a corporation of Delaware
No Drawing. Filed Aug. 10, 1966, Ser. No. 571,411
U.S. Cl. 260—672                               6 Claims
Int. Cl. C07c 3/58, 15/00

ABSTRACT OF THE DISCLOSURE

The selectivity, that is the moles of dealkylated aromatic compound produced per mol of dealkylatable aromatic compound converted, of a thermal hydrodealkylation reaction in an unpacked tubular reactor is maintained at a value of above about 90 and for a time sufficient to convert about 90 percent of said dealkylatable aromatic compound by determining the concentrations of hydrogen and methane in the gaseous reactor effluent and introducing hydrogen into the reactor at a rate such that the coking factor, $K_c$, at the reactor outlet is maintained in the range of from 2.0 to 9.0, where $K_c$ is defined as:

$$K_c = \frac{(Y_{H_2})^2 (P_t)}{K_e (Y_{CH_4})}$$

---

This invention relates to the preparation of an aromatic compound, particularly to the dealkylation of a dealkylatable aromatic compound, e.g., toluene, xylenes, methyl naphthalene, etc. to prepare the dealkylated compound, e.g., benzene, toluene, naphthalene, etc. This invention relates especially to the preparation of benzene by the thermal hydrodealkylation of toluene.

The preparation of benzene from toluene is broadly old. Generally speaking the dealkylation of toluene proceeds in a manner analogous to the dealkylation of methyl naphthalene to prepare naphthalene or the dealkylation of xylenes to toluene. There are two methods commercially suitable for this conversion, i.e., the catalytic method and the thermal method. The thermal method is generally performed by passing a mixture of hydrogen and toluene through a heater to raise the reactants to some threshold temperature such as 1200 to 1300° F. and then maintaining the reaction temperature in the 1300 to 1500° F. range for a sufficient period of time to obtain the desired conversion. The pressure on the reactants may be maintained within a wide range, generally between 300 p.s.i.g. and 1100 p.s.i.g., but pressures above 1100 p.s.i.g. may be used. It has been found in commercial practice that the hydrogen-to-toluene ratio should be substantially in excess of the stoichiometric amount to prevent decomposition of the methane formed in the dealkylation reaction and the coking which results from this decomposition Generally, a hydrogen-to-toluene mol ratio of between 2 and 20 is suitable, higher hydrogen-toluene ratios being required at the lower pressures and lower ratios being acceptable at the higher pressures. A hydrogen-toluene ratio of from 4 to 6 is generally satisfactory at pressures in the range of 800 to 1000 p.s.i.g. In addition, the content of the hydrogen rich gas injected at the heater inlet, i.e., the purity of the gas with respect to hydrogen should be maintained at no less than 60 vol. percent, preferably between 70 and 80 vol. percent. The lower hydrogen concentrations may be used at higher reactor pressures such as 800–1000 p.s.i.g.

The thermal dealkylation process is suitably performed in an unpacked reaction coil in a fired heater. Usually the inlet temperature to this section of the heater is separately controlled by regulating the heat release in the pre-heat section. The temperature in the reaction section is preferably maintained within narrow limits by injection of a hydrogen rich gas at at least 2 points. The first quench point may be about ⅓ of the distance from the reactor inlet and the second quench point may be about ⅓ the distance from the reactor outlet. A substantial amount of quench or exchanger cooling is used to reduce the temperature in the heater transfer line to a substantially lower temperature, for example, 100 to 200° F., without any more reduction in pressure than is associated with passage of the reactor effluent through the cooling equipment. The cooled heater effluent is separated in a high pressure separator into a hydrogen-rich recycle stream (bleed gas) and a liquid. The liquid is stabilized and fractionated to separate unconverted toluene and products lighter than benzene. The toluene is recycled to the heater inlet.

The coil-reactor volume is that required to provide the residence time necessary for the degree of conversion desired at the feed rate for which the unit is designed. For example, 90% conversion of toluene to benzene has been found to require 6 seconds residence time above 1300° F. for 1360° F. reaction temperature; 95% conversion requires 6.6 seconds residence time above 1300° F. at the same reactor temperature, namely, 1360° F. Higher temperatures and longer residence times result in higher conversions. However, the rate of increase in conversion falls off substantially at increased residence times and it becomes economically undesirable to design for a conversion much above 95%.

We have found that the hydrogen partial pressure in the reaction section and the reaction temperature affect the selectivity of the toluene dealkylation process at a constant toluene feed rate and fixed residence time in the reactor. We have discovered that the selectivity can be quickly and easily determined and that the operating parameters can be varied to obtain the desired selectivities and, thereby, the optimum yield to dealkylated aromatics since the yield is the product of the conversion, in terms of mols of toluene disappearing, and the selectivity, in terms of mols of benzene produced per mol of toluene converted.

It is an object of this invention, therefore, to provide a process for dealkylation of a dealkylatable hydrocarbon at the desired selectivity wherein the parameters are chosen within commercially feasible limits.

It is another object of this invention to provide a means for determining rapidly and with relative ease changes in the selectivity whereby adjustments can be made either manually or by automatic control to bring the selectivity back to the desired value.

These and other objectives and advantages will become more apparent from the following complete description and from the appended claims.

Broadly this invention contemplates a process for the dealkylation of a dealkylatable aromatic compound which comprises charging hydrogen and a dealkylatable aromatic compound into a reactor at a temperature, pressure and hydrogen to methane ratio in the reactor effluent such that the coking factor, $K_c$ is at least 2.0, where $K_c$ is defined as:

$$K_c = [(Y_{H_2})^2 (P_t)] / [(K_e)(Y_{CH_4})]$$

where $Y_{H_2}$ = hydrogen concentration in reactor effluent gas, mol fraction.

$Y_{CH_4}$ = methane concentration in reactor effluent gas, mol fraction.

$P_t$ = total pressure in the reaction zone, atmospheres.

$K_e$ = equilibrium constant for the reaction $CH_4 \rightleftharpoons C + 2H_2$ at the maximum temperature in the dealkylation zone.

We have found that the selectivity is related to the coking factor, $K_c$, at the reactor outlet as defined in the above equation. The equilibrium constant $K_e$ is calculated from the free energy function and the standard heat of formation data presented in the American Petroleum Institute Project 44 Tables and the maximum temperature in the dealkylation zone.

It is apparent from the above equation that $K_c$ increases with increasing hydrogen concentration and with reduced methane concentration in the gaseous effluent and with reduced temperature since $K_e$ increases in temperature. This dictates that the reactor temperature be kept as low as possible while maintaining practical residence times and high conversions. Since increased pressures and higher hydrogen circulation rates carry economic penalties, it is desirable to operate at the lowest coking factor consistent with good operations. Excessive coking is experienced below a coking factor of 2.0 and selectivity increases less rapidly at coking factors above 5.0 as shown by the following data:

| Coking factor, $K_c$ | Selectivity, mol percent | Increase in selectivity per unit increase in $K_c$ |
|---|---|---|
| 2.0 | 90.3 | (Coking) |
| 3.0 | 91.8 | 1.5 |
| 4.0 | 93.1 | 1.3 |
| 5.0 | 94.0 | 0.9 |
| 6.0 | 94.6 | 0.6 |
| 7.0 | 95.1 | 0.5 |
| 8.0 | 95.4 | 0.3 |
| 9.0 | 95.7 | 0.3 |

As shown by these data, there is quite an advantage for operating above a 2.0 coking factor but there is very little advantage for operating much above a 5.0 coking factor. Obviously, for optimum operation it is essential that the coking factor, and thus selectivity be controlled over a fairly narrow range. Operation of the process with a coking factor between 3.0 and 9.0, particularly between 4.0 and 7.0, is preferred.

Since the hydrogen-methane ratio in the product gas reflects the coking factor being maintained in the reactor, this ratio or some physical measurement that reflects variations in this ratio, such as the specific gravity of the high pressure separator bleed gas, can be used to control the temperature, pressure or hydrogen circulation rate to maintain the coking factor at some pre-determined economical value. The most direct approach to the problem of adjusting operating conditions to maintain a constant coking factor, and thereby a constant selectivity, is to control the pressure on the reactor. However, variations in reactor pressure affect hydrogen quench rates into the reactor and adversely affect the operation of the recycle gas compressor. Adjustments in the gas recycle rate is also impractical. A more desirable approach is to adjust the reactor temperature to bring the coking factor back to the desired value. This is done, for example, in any one of several ways:

(1) Hydrogen quench rates to the reaction section are maintained constant and the reactor inlet temperature varied by adjusting the firing rate to the pre-heat section. This raises or lowers the reaction temperature throughout the reactor section of the heater.

(2) The set point for the temperature controllers regulating the hydrogen flow rates into the reactor at the quench points are reset to raise or lower the overall reaction temperature.

(3) The set point on the temperature controller for the hydrogen quench nearest the heater outlet is reset. This has the effect of varying the length of the coil reactor and, thereby, the residence time at reaction temperature. The third of the three methods described above is the preferred method of control. In any case, the changes can be made manually on the basis of the hydrogen-methane ratio in the recycle gas or by determining the specific gravity of the recycle gas. Alternatively, an apparatus capable of determining either the hydrogen-methane ratio or specific gravity is used to carry out automatically the adjustments required for any one of the three methods of control outlined above.

In order to more fully illustrate the nature of this invention and the manner of practicing the same, the following examples are given.

Example 1

Ten barrels per hour toluene are charged into a heater together with 90,800 s.c.f.h. of gas containing 74 volume percent hydrogen. The hydrogen-to-toluene mol ratio is about 5.38. The reaction mixture is heated to a maximum of 1400° F. in a separate dealkylation zone. The pressure on the reactants in the heater and in the dealkylation zone is 800 p.s.i.g. The residence time of the toluene and hydrogen above 1200° F. is 5.4 seconds. The dealkylation zone effluent is withdrawn and the liquid-gaseous mixture is introduced into a high pressure separator from which the liquid constituents are withdrawn from separation of product from unreacted toluene and recycle of the unreacted toluene to the heater. The mole fraction of hydrogen was 0.5973 and ratio of hydrogen to methane in the high pressure separator bleed gas is 1.6 as determined by a mass spectrograph. The coking factor, $K_c$, for the process is 3.66. The overall reaction selectivity is 93.2% and the conversion of toluene is 93.7%. The yield of product (benzene) is 87.4 mol percent, basis feed. When operating the process using the same conditions as above except for the pressure, which is maintained at 500 p.s.i.g., and a slightly increased residence time, a $H_2/CH_4$ mol ratio of 1.22 results. The coking factor is 1.66 and the reaction selectivity was about 89.3% at a toluene conversion of 99.2%. The yield of product (benzene) is 88.5%, basis feed.

Accordingly, it is seen that the reaction selectivity is affected when one of the parameters is varied and this is reflected in the hydrogen-methane ratio in the high pressure separator gas and in the coking factor which is a function of this relationship. In this case, the lower pressure decreases the value of the numerator of the equation for $K_c$ which in turn decreases the value of the coking factor, $K_c$. As this value is below 2.0, the reaction causes undue coking and represents an undesirable operation.

Example 2

Recycle gas containing 71.9% hydrogen in mixture with toluene in the amount required to give a mol ratio of 5.50 mols of hydrogen per mol of toluene was charged to a heater and the reaction mix was heated to 1359° F. in the reaction zone. Pressure on the reactor is 800 p.s.i.g. and the residence time of the toluene and hydrogen above 1200° F. is 7.22 seconds. The reaction mixture is quenched and introduced into a high pressure separator from which the liquid constituents are withdrawn for separation of product from unreacted toluene and the gas from the high pressure separator is recycled to the heater inlet. Unreacted toluene is separated and recycled to the heater. The mole fraction of hydrogen was 0.5723 and ratio of hydrogen to methane in the bleed gas from the high pressure separator is 1.46 as determined by mass spectrograph analysis on the bleed gas. The coking factor for this run is 3.97 and the selectivity is 93.2. A conversion of 88.7% is obtained. The benzene yield is 82.6%, basis feed. When the temperature is reduced to 1325° F. at the same reactor pressure, recycle gas hydrogen content and hydrogen-toluene ratio, but with a slightly increased residence time, the hydrogen-methane ratio in the bleed gas increases to 1.55. The coking factor is 5.4 and the selectivity 95.8. A conversion of 92.7% is obtained. The benzene yield is 88.7%, basis feed.

It is apparent from the above examples that it is possible to vary the coking factor and thereby the selectivity of the toluene dealkylation process by varying either the hydrogen concentration or the reaction temperature at constant feed rate for a given heater arrangement. It is also readily apparent that one may determine, by means readily available, the hydrogen-methane ratio in the bleed gas from the high pressure separator and use this information to determine immediately by correlations readily available the selectivity being maintained. One can also readily determine the coking factor and determine whether it is feasible or economically desirable to adjust operating parameters to bring the coking factor back to a pre-determined value and thereby maintain selectivity. Inasmuch as this is generally done most easily by adjusting the quench to the outlet section of the coil reactor, automatic adjustment of the quench rate by means of an apparatus which is capable of sensing the hydrogen-methane ratio in the bleed gas is entirely practical.

Many modifications and variations of the present invention are possible in light of the above teachings and may be made without departing from the spirit and scope thereof. It should be realized for instance that instead of toluene being reacted as in the examples given, xylenes can be demethylated using the exact same procedure to form toluene and the toluene so formed in that process can be further dealkylated to prepare benzene. Also the same manipulative procedure as set forth above can be used to convert methyl naphthalene to naphthalene. This process also can be operated at the optimum selectivity for conversion of methyl naphthalene to naphthalene by proper choice of reaction parameters.

We claim:

1. In a process for the dealkylation of a dealkylatable aromatic compound wherein hydrogen and a dealkylatable aromatic compound are charged in an unpacked tubular reactor under conditions of temperature and pressure for a time sufficient to convert at least about 90 percent of said dealkylatable aromatic compound, the improvement which comprises maintaining the selectivity of conversion of said aromatic compound to dealkylated product above about 90 by determining the concentrations of hydrogen and methane in the gaseous effluent from said reactor and introducing hydrogen to said reactor at a rate such that the coking factor $K_c$ at the reactor outlet is maintained in the range of from 2.0 to 9.0, wherein said coking factor $K_c$ is defined as:

$$K_c = \frac{(Y_{H_2})^2 (P_t)}{K_e (Y_{CH_4})}$$

where, $Y_{H_2}$ = hydrogen concentration in the reactor effluent gas, mol fraction
$Y_{CH_4}$ = methane concentration in the reactor effluent gas, mol fraction
$P_t$ = total pressure in the reaction zone, atmospheres
$K_e$ = equilibrium constant for the reaction $CH_4 \rightleftharpoons C + 2H_2$ at the maximum temperature in the dealkylation zone.

2. In a process for the hydrodealkylation of toluene wherein hydrogen and toluene are contacted in an unpacked tubular reactor at temperatures of from 1200 to 1500° F., at pressures of from 300 to 1100 p.s.i.g., and at mole ratios of hydrogen to toluene of between 2 and 20 for a time sufficient to convert at least about 90 percent said toluene, the improvement which comprises maintaining the selectivity of conversion of toluene to benzene above about 93 by determining the concentrations of hydrogen and methane in the gaseous effluent from said reactor and introducing hydrogen to said reactor at a rate such that the coking factor $K_c$ at the reactor outlet is maintained in the range of from about 4.0 to about 7.0 wherein said coking factor $K_c$ is defined as:

$$K_c = \frac{(Y_{H_2})^2 (P_t)}{K_e (Y_{CH_4})}$$

$Y_{H_2}$ = hydrogen concentration in the reactor effluent gas, mol fraction
$Y_{CH_4}$ = methane concentration in the reactor effluent gas, mol fraction
$P_t$ = total pressure in the reaction zone, atmospheres
$K_e$ = equilibrium constant for the reaction $CH_4 \rightleftharpoons C + 2H_2$ at the maximum temperature in the dealkylation zone.

3. A process according to claim 1 wherein the coking factor is between 4.0 and 7.0.

4. A process according to claim 1 wherein said coking factor is about 5.0.

5. A process according to claim 1 wherein the dealkylatable aromatic compound is toluene.

6. A process according to claim 5 wherein the temperature in the dealkylation zone is from 1300 to 1500° F. and the pressure is between 300 and 1100 p.s.i.g.

References Cited

UNITED STATES PATENTS

| | | | |
|---|---|---|---|
| 2,462,995 | 3/1949 | Ritzmann | 23—253 |
| 2,924,569 | 2/1960 | Souby | 208—107 |
| 3,160,671 | 12/1964 | Feigelman et al. | 260—672 |
| 3,288,875 | 11/1966 | Payne et al. | 260—672 |
| 3,171,862 | 3/1965 | Larkins et al. | 260—672 |
| 3,192,281 | 6/1965 | Corneil | 260—672 |
| 3,101,380 | 8/1963 | Hariu | 260—672 |
| 3,322,842 | 5/1967 | Czajkowski et al. | 260—672 |
| 3,284,525 | 11/1966 | Begley | 260—672 |
| 2,768,219 | 10/1956 | Hoffmann et al. | 260—672 |
| 2,929,775 | 3/1960 | Aristoff et al. | 208—133 |

OTHER REFERENCES

Asselin and Erickson: "Dealkylation," Oil Gas J. 60 (12) pp. 127–129 Mar. 19, 1962.

Fowle and Pitts: "Thermal Hydrodealkylation," Ch. Eng. Prog. 58 (4) pp. 37–40 (1962).

Feigelman et al.: "Lowest Cost Route to Benzene," Hydroc. Proc. 44 (12) pp. 147–50 (1965).

Feigelman and O'Connor: "HDA Process Makes Cheap Benzene," Hydroc. Proc. 45 (5) pp. 139–44 (1966).

DELBERT E. GANTZ, *Primary Examiner.*

G. E. SCHMITKONS, *Assistant Examiner.*

U.S. Cl. X.R.

208—48, 107